United States Patent
Nanri et al.

(10) Patent No.: US 9,313,710 B2
(45) Date of Patent: Apr. 12, 2016

(54) WIRELESS BASE STATION APPARATUS AND COMMUNICATION CONTROL METHOD

(75) Inventors: Masahiko Nanri, Kanagawa (JP); Harunobu Sato, Kanagawa (JP)

(73) Assignee: Nokia Solutions and Networks Oy, Espoo (FI)

( * ) Notice: Subject to any disclaimer, the term of this patent is extended or adjusted under 35 U.S.C. 154(b) by 104 days.

(21) Appl. No.: 14/007,443

(22) PCT Filed: Apr. 24, 2012

(86) PCT No.: PCT/JP2012/002792
§ 371 (c)(1),
(2), (4) Date: Sep. 25, 2013

(87) PCT Pub. No.: WO2012/147332
PCT Pub. Date: Nov. 1, 2012

(65) Prior Publication Data
US 2014/0016615 A1  Jan. 16, 2014

(30) Foreign Application Priority Data
Apr. 27, 2011  (JP) .................... 2011-099184

(51) Int. Cl.
*H04W 4/00* (2009.01)
*H04W 36/20* (2009.01)
(Continued)

(52) U.S. Cl.
CPC .......... *H04W 36/20* (2013.01); *H04W 52/0206* (2013.01); *H04W 52/367* (2013.01); *H04W 36/165* (2013.01); *H04W 52/244* (2013.01); *H04W 52/50* (2013.01); *H04W 76/046* (2013.01)

(58) Field of Classification Search
CPC .............. H04W 36/20; H04W 36/165; H04W 52/0206; H04W 52/367; H04W 52/244; H04W 52/50; H04W 76/046
USPC .................. 370/230, 311, 328, 329, 331, 338
See application file for complete search history.

(56) References Cited

U.S. PATENT DOCUMENTS

| 2007/0058588 A1* | 3/2007 | Fashandi et al. ............... 370/331 |
| 2010/0157820 A1* | 6/2010 | Cheng et al. .................. 370/252 |

(Continued)

FOREIGN PATENT DOCUMENTS

| JP | 10-145842 | 5/1998 |
| JP | 2009-17139 | 1/2009 |
| JP | 2010-183287 | 8/2010 |

OTHER PUBLICATIONS

International Search Report dated May 22, 2012.
(Continued)

*Primary Examiner* — Peter Cheng
(74) *Attorney, Agent, or Firm* — Harrington & Smith

(57) ABSTRACT

Provided are a wireless base station apparatus and communication control method whereby a peripheral terminal device immediately hands over to a base station apparatus when said base station apparatus is activated. In response to timer values and the number of terminal units within a coverage area, a controller (504) of an MeNB (500) selects a dormant mode, activation mode or stationary mode for the base station itself and notifies an uplink received signal determiner (505) and transmission power determiner (506) of the selected mode information. In activation mode, the uplink received signal determiner (505) sets the timing for initial connection signals more frequently than dormant mode. In activation mode, the transmission power determiner (506) determines the increase in downlink transmission power over time and notifies the downlink transmission signal processor (507) of the transmission power.

11 Claims, 7 Drawing Sheets

(51) Int. Cl.
*H04W 52/02* (2009.01)
*H04W 52/36* (2009.01)
*H04W 52/24* (2009.01)
*H04W 52/50* (2009.01)
*H04W 76/04* (2009.01)
*H04W 36/16* (2009.01)

(56) References Cited

U.S. PATENT DOCUMENTS

2011/0009147 A1\* 1/2011 Morita et al. ............ 455/509
2012/0026952 A1 2/2012 Okubo
2013/0079009 A1\* 3/2013 Aumann et al. ........... 455/436

OTHER PUBLICATIONS

3GPP TR 36.927 V10.1.0, "3$^{rd}$ Generation Partnership Project; Technical Specification Group Radio Access Network; Evolved Universal Terrestrial Radio Access (E-UTRA); Potential solutions for energy saving for E-UTRAN (Release 10)," Sep. 2011, pp. 1-22.

3GPP TSG RAN WG3 #69bis Meeting, "Scenario for Inter-eNB Energy Saving Enhancement," CHTTL, R3-102894, Xi-an, China, Oct. 11-15, 2010, pp. 1-2.

3GPP TSG-RAN WG3 #70 meeting, "TP for Further Inter-eNB Energy Saving Scenario," CMCC, R3-103390, Jacksonville, USA, Nov. 15-19, 2010. pp. 1-2.

\* cited by examiner

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1,6 |
| 7 | 0 | Any | 2,7 |
| 8 | 0 | Any | 3,8 |
| 9 | 0 | Any | 1,4,7 |
| 10 | 0 | Any | 2,5,8 |
| 11 | 0 | Any | 3,6,9 |
| 12 | 0 | Any | 0,2,4,6,8 |
| 13 | 0 | Any | 1,3,5,7,9 |
| 14 | 0 | Any | 0,1,2,3,4,5,6,7,8,9 |

FIG. 6

WIRELESS BASE STATION APPARATUS AND COMMUNICATION CONTROL METHOD

TECHNICAL FIELD

The present invention relates to a radio base station apparatus that controls downlink transmission power and uplink received signals when the apparatus is activated.

BACKGROUND ART

In recent years, providing small-cell base station apparatuses (hereafter referred to as HeNB: Home eNode B) each having a small cell radius in addition to macro-cell base station apparatuses (hereafter referred to as MeNB: Macro eNode B) each having a large cell radius has been considered so as to compensate a dead zone for mobile phones or to disperse data traffic. By providing HeNB, concentration of the traffic on a specific base station (hereafter referred to as eNB) is reduced, and a high user throughput as an entire network is expected.

However, in a time period when the number of network users is small such as midnight hours, a required throughput for each eNB declines, and thus constantly keeping a number of eNB in an active state at the same time would result in excessive energy consumption.

In order to solve this problem, a technique for suspending functions other than essential functions, based on the usage status of eNB, has been proposed. NPL 1 discloses a method for a shift to a power-saving mode for suspending the downlink transmission function of eNB when it is determined that no UE is present in an area covered by eNB.

FIGS. 1A to 1D illustrate a technique disclosed in NPL 1. In FIG. 1A, HeNB 102 is provided in a coverage of MeNB 101, and two mobile station apparatuses (hereafter referred to as UE: User Equipment) UE 103 and UE 104 are further present in the coverage of MeNB 101. In a case illustrated in FIG. 1A, no UE is present in the coverage of HeNB 102. Accordingly, HeNB under such a circumstance stops downlink transmission (FIG. 1B). Since MeNB 101 covers the area used to be covered by HeNB 102 (inside the broken line in FIG. 1B), the communication connection is secured even if UE is moved to the area.

In FIG. 1B, when new UE 105 and UE 106 enter the area covered by HeNB 102 (FIG. 1C) and HeNB 102 recognizes that UE is present in the area covered by HeNB 102 by detecting uplink signals from UE 105 or UE 106, for example, HeNB 102 starts downlink transmission (FIG. 1D).

Another technique disclosed in NPL 1 is illustrated in FIGS. 2A to 2D. FIG. 2A illustrates an example in which four HeNBs, that is, HeNBs 202 to 205 are provided in the coverage of MeNB 201. Furthermore, although UE 206 and UE 207 are present in the area covered by MeNB 201, the UEs establish connection with HeNB 203 and HeNB 204, respectively, instead of MeNB 201. In this case, since there is no UE that established connection with MeNB 201, MeNB under such a circumstance stops downlink transmission. In order to fill the dead zone due to the downlink transmission stopped by MeNB 201, HeNB 202 to HeNB 205 increase the downlink transmission power, expanding the coverage of each of the HeNBs (FIG. 2B).

In FIG. 2B, when new UE 208 to UE 216 enter the area covered by MeNB 201 (FIG. 2C), and MeNB 201 recognizes that the increase in the number of UEs in its own area, MeNB 201 starts the downlink transmission. HeNB 202 to HeNB 205 subsequently lower the downlink transmission power, setting the coverage of each HeNB back to a regular range (FIG. 2D).

CITATION LIST

Non-Patent Literature

NPL 1
TR36.927 "Potential solutions for energy saving for E-UTRAN"

SUMMARY OF INVENTION

Technical Problem

When eNB starts the downlink transmission, neighboring UEs around the eNB connected to other eNBs nearby can be a large source of interference immediately after the eNB starts transmitting the downlink signals. For this reason, it is preferable that the neighboring UEs are immediately handed over to the eNB.

However, handovers, that is, random access channel (hereafter referred to as RACH) transmission from the neighboring UEs occur at the same time immediately after eNB is activated. Accordingly, RACHs between the UEs tend to collide, making it difficult to complete the handovers immediately. This tendency becomes more prominent when the cell radius of a base station is larger, or when the neighboring UEs are closely located. For example, in the example in FIG. 2D, UE 208, UE 211, UE 212, UE 213, UE 214, and UE 216 transmit RACH at the same time for the handovers to MeNB 201. As a result, RACHs from the UEs collide or interfere with each other, and the RACHs transmitted from all of UEs end up to be resent. In addition, in RACH, a time resource that can be allocated is set to have a long interval, unlike a regular data channel. Resending RACH takes a long time, and consequently it takes a long time for MeNB 201 to detect RACH from all of the UEs correctly and to complete the handovers.

It is an object of the present invention to provide a radio base station apparatus and a communication control method in which peripheral terminal apparatuses of a radio base station apparatus are immediately handed over to the radio base station apparatus when the radio base station apparatus is activated.

Solution to Problem

A radio base station apparatus configured to shift to a first state in which transmission and reception of a radio signal are stopped, a second state in which transmission and reception of a radio signal are started, and a third state in which a radio signal is transmitted in transmission power necessary for securing a predetermined communication range, the radio base station apparatus comprising: a downlink transmission signal processing section configured to instruct, in the second state and the third state, a terminal apparatus timing for transmitting an initial connection signal; an uplink received signal processing section configured to receive the initial connection signal transmitted by the terminal apparatus at the timing for transmitting the initial connection signal; and an uplink reception determining section configured to determine the timing for transmitting the initial connection signal such that the initial connection signal is sent more frequently in the second state than in the third state.

A method for controlling communication according to the present invention is a method for controlling communication in a radio base station apparatus that shifts to a first state in which transmission and reception of a radio signal are stopped, a second state in which transmission and reception of a radio signal are started, and a third state in which a radio signal is transmitted in transmission power necessary for securing a predetermined communication range, the method including: instructing, in the second state and the third state, a terminal apparatus timing for transmitting an initial connection signal; receiving the initial connection signal transmitted by the terminal apparatus at the timing for transmitting the initial connection signal; and determining the timing for transmitting the initial connection signal, such that the initial connection signal is sent more frequently in the second state than in the third state.

Advantageous Effects of Invention

According to the present invention, the possibility of RACH collision between the terminal apparatuses at the time when the base station apparatus is activated is reduced without the base station apparatus individually signaling the peripheral terminal apparatuses. Therefore, the handovers to the base station apparatus can be immediately conducted.

BRIEF DESCRIPTION OF DRAWINGS

FIG. 6 illustrates a table listing receipt frequency of PRACH according to the embodiment of the present invention.

DESCRIPTION OF EMBODIMENTS

An embodiment of the present invention will be described in detail with reference to the accompanying drawings.

Embodiment

Figure 1A:
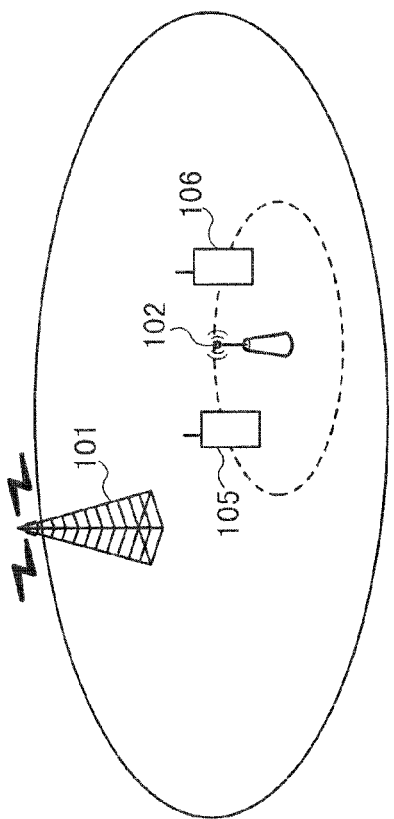
FIGS. 1A to 1D are diagrams illustrating a technique disclosed in NPL 1.
Figure 1B:
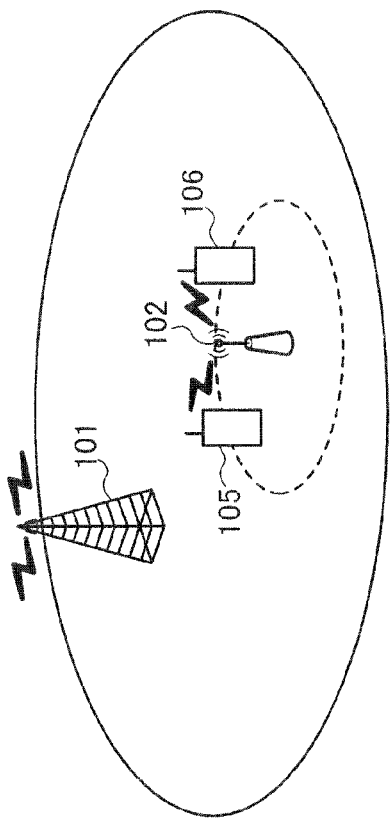
Figure 1C:
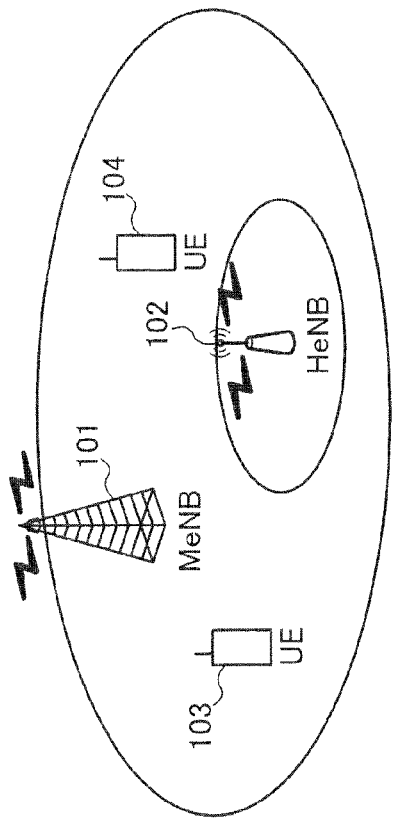
Figure 1D:
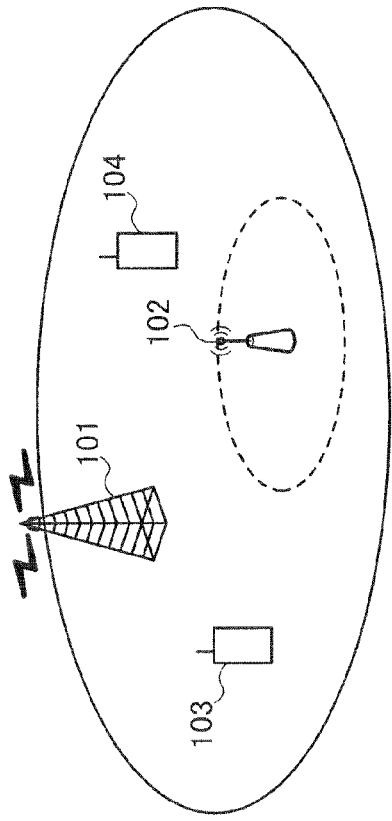
Figure 2C:
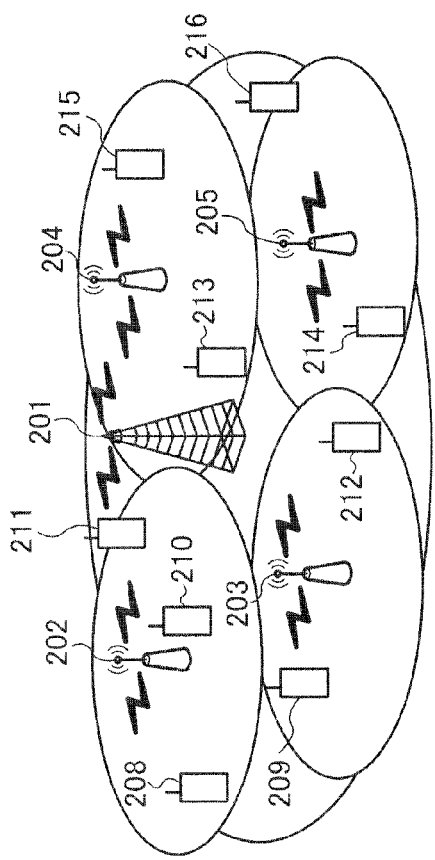
FIGS. 2A to 2D are diagrams illustrating another technique disclosed in NPL 1.
Figure 2D:
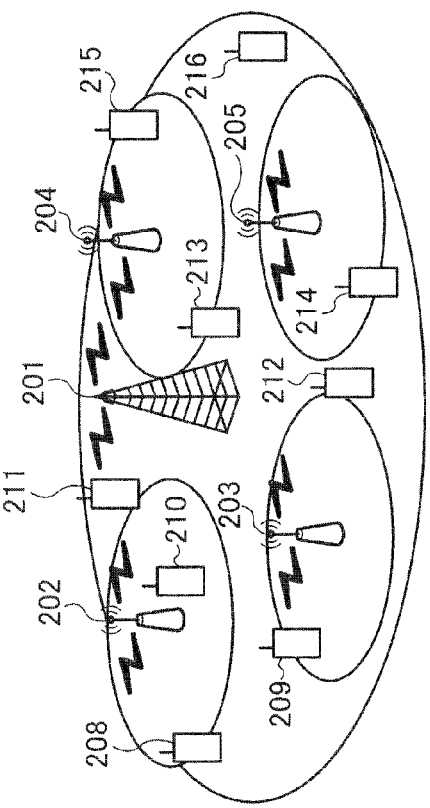
Figure 2A:
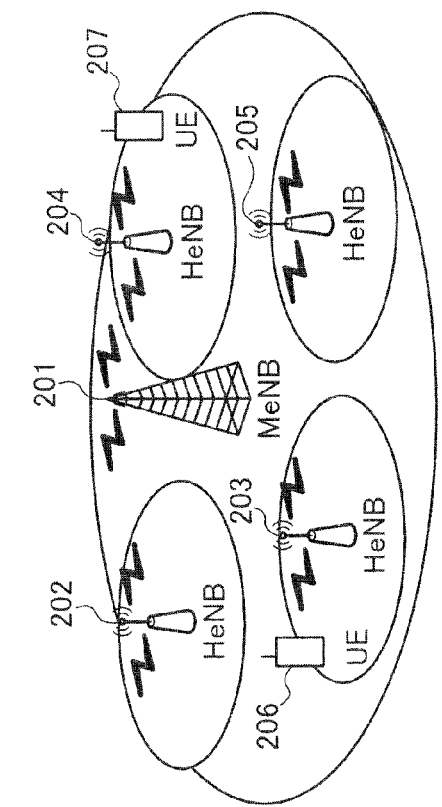
Figure 2B:
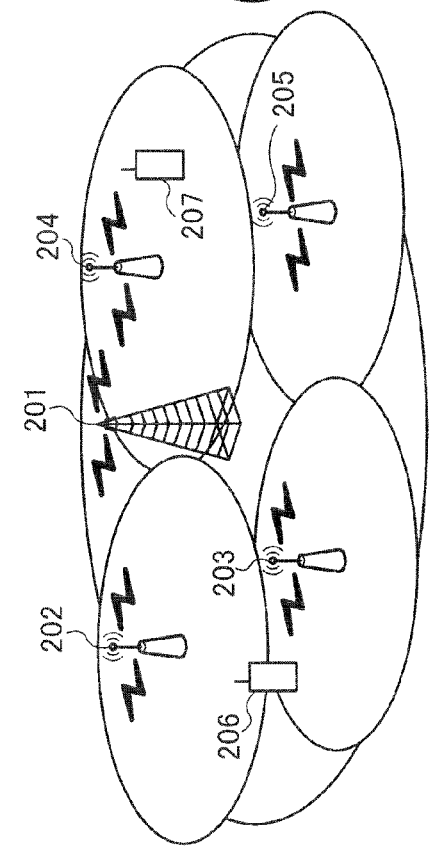
Figure 3A:
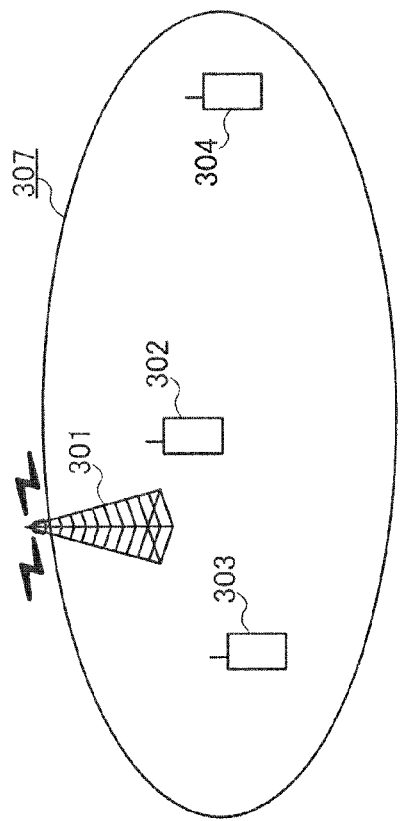
FIGS. 3A to 3C are diagrams illustrating an example of system configuration according to an embodiment of the present invention.
Figure 3B:
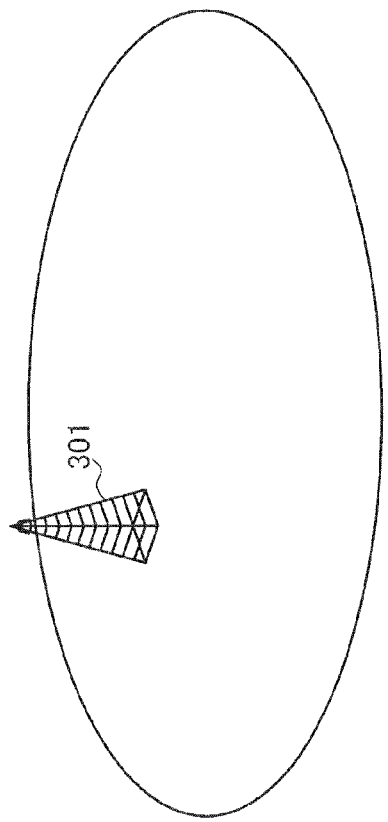
Figure 3C:
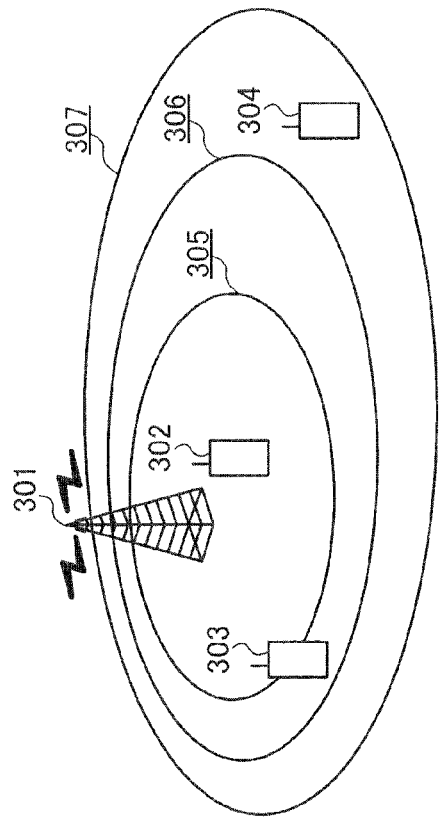
Figure 4:
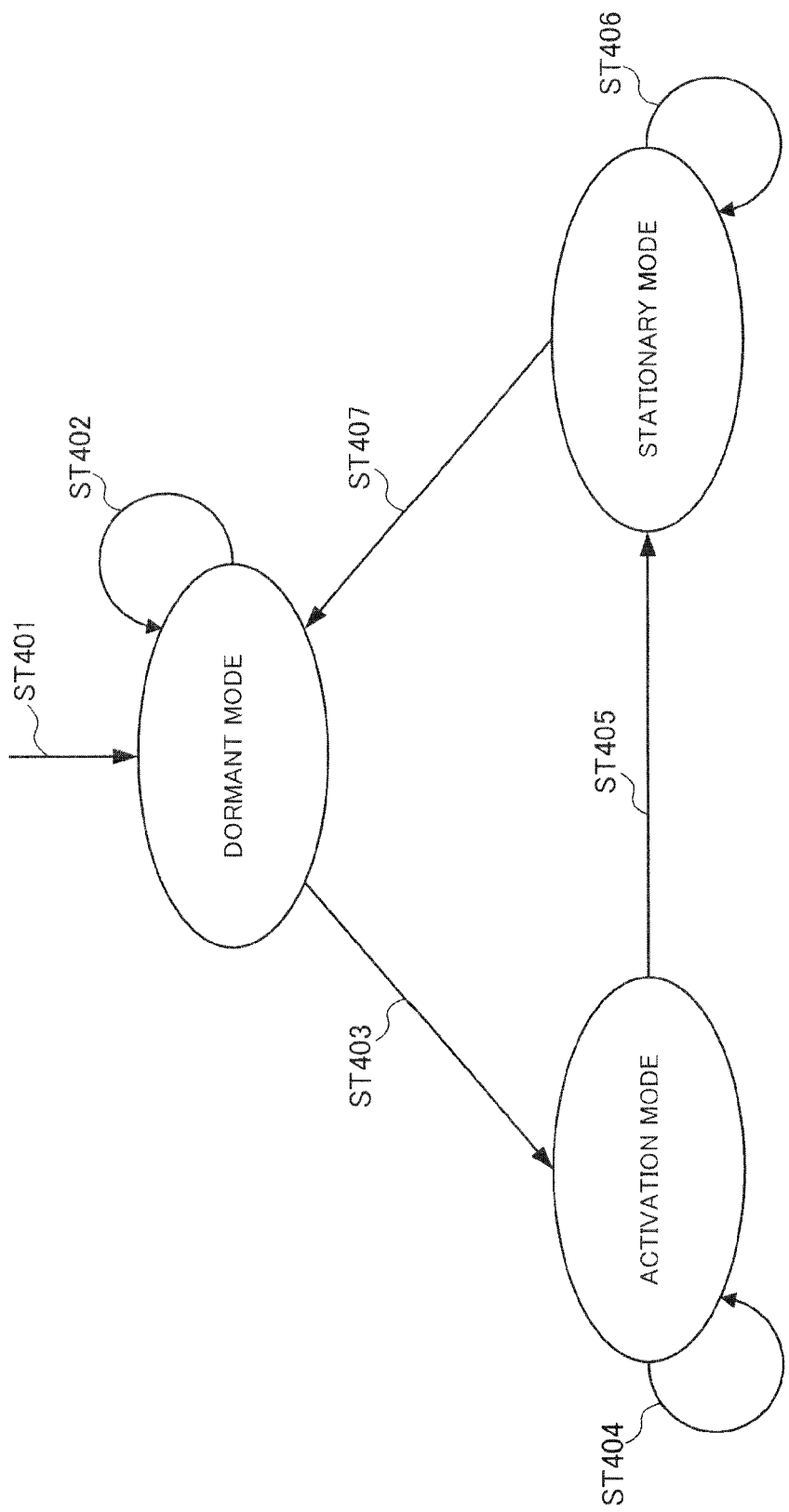
FIG. 4 is a diagram illustrating shifts of states in MeNB according to the embodiment of the present invention.

FIGS. 3A to 3C illustrate an example of system configuration according to an embodiment of the present invention, and FIG. 4 is a diagram illustrating shifts of states in MeNB 301 illustrated in FIGS. 3A to 3C. As an example of radio communication system, an LTE (Long Term Evolution) system is used for description.

First, MeNB 301 is in a state immediately after placement (ST401) and referred to as "dormant mode" (corresponding to the first state). This state indicates that the downlink transmission and uplink reception by MeNB 301 are stopped as illustrated in FIG. 3A. In the dormant mode, the dormant mode is maintained until conditions for shift to the next "activation mode" (corresponding to the second state) are satisfied (ST402). The conditions for the shift will be described later.

When MeNB 301 in the dormant mode satisfies the certain conditions, MeNB 301 shifts to an activation mode (ST403). This state indicates that a downlink transmission power of MeNB 301 gradually increases, expanding coverage from 305 to 306 and 307. In the activation mode, the activation mode is maintained until conditions for shift to the next "stationary mode" (corresponding to the third state) are satisfied (ST404). The conditions for the shift will be described later.

When MeNB 301 in the activation mode satisfies the certain conditions, MeNB 301 shifts to the stationary mode (ST405). The stationary mode indicates that MeNB 301 fixes the downlink transmission power to certain power such that the coverage is maintained at a constant level. In the stationary mode, the stationary mode is maintained until conditions for shift to the next "dormant mode" are satisfied (ST406). The conditions for the shift will be described later.

When MeNB 301 in the stationary mode satisfies the certain condition, MeNB 301 shifts to the dormant mode (ST407).

Figure 5:
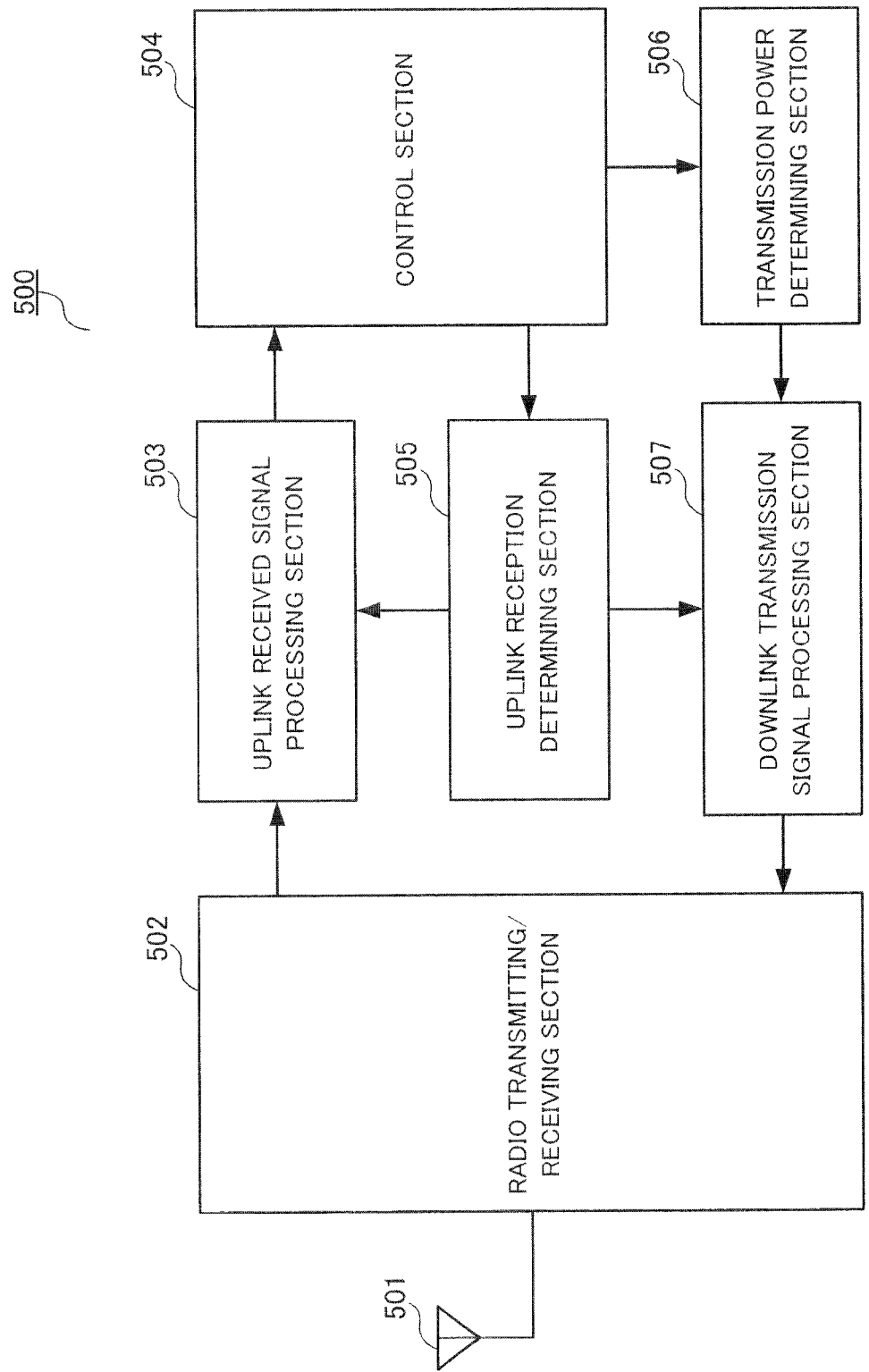
FIG. 5 is a block diagram illustrating configuration of MeNB according to the embodiment of the present invention.

FIG. 5 is a block diagram illustrating the configuration of MeNB 500 according to the embodiment of the present invention. The configuration of MeNB 500 will be described as follows referring to FIG. 5.

Radio transmitting/receiving section 502 receives an uplink radio signal from a UE within its own coverage via antenna 501, performs predetermined radio processing on the received uplink radio signal in order to convert the signal to an uplink baseband signal, and outputs the uplink baseband signal to uplink received signal processing section 503. When MeNB 500 is in the activation mode or the stationary mode, radio transmitting/receiving section 502 performs predetermined radio processing on the downlink baseband signal provided by downlink transmission signal processing section 507 in order to convert the signal into a downlink radio signal, and outputs the downlink radio signal to antenna 501.

Uplink received signal processing section 503 performs predetermined demodulation on the uplink baseband signal provided from radio transmitting/receiving section 502 so as to generate an uplink received signal. The uplink received signal includes, in addition to a PRACH (Physical Random Access Channel) corresponding to an initial connection signal, a PUCCH (Physical Uplink Control Channel) for multiplexing control information, a PUSCH (Physical Uplink Shared Channel) for mainly multiplexing data signals, an SRS (Sounding Reference Signal) for measuring quality of an uplink channel, and others. The uplink received signal generated is provided to control section 504.

Control section 504 manages the number of UE (hereafter $N_{UE}$) present in the coverage of MeNB 500, based on the uplink received signal provided from the uplink received signal processing unit 503. More specifically, among the output from uplink received signal processing section 503, when control section 504 detects a message indicating that UE successfully conducts a handover to MeNB 500 (RRC connection Reconfiguration Complete Message), control section 504 increments $N_{UE}$. Furthermore, when control section 504 detects an uplink reception quality report (measurement report) from an output of uplink received signal processing section 503, and when the value is smaller than a predetermined threshold, control section 504 considers the UE to be handed over to another cell, and decrements $N_{UE}$. Control section 504 is capable of managing modes of MeNB 500, and further includes a timer that manages an elapsed time since the shift to the dormant mode and a timer that manages an elapsed time since the shift to the activation mode (not illustrated). The mode information determined by control section 504 is provided to uplink reception determining section 505 and transmission power determining section 506.

The uplink reception determining section 505 determines receipt frequency of the PRACH based on the mode information provided from control section 504, and provides the result to uplink received signal processing section 503 and downlink transmission signal processing section 507.

The receipt frequency of the PRACH determined by uplink reception determining section 505 will be described in detail. FIG. 6 illustrates a table listing the receipt frequency of the PRACH held by uplink reception determining section 505. A PRACH Configuration Index is a number representing the receipt frequency of the PRACH. Preamble Format is a number representing a physical channel structure of the PRACH, and a value from 0 to 4 is assigned. As an example, all of Preamble Formats here are set to zero. This is a channel structure assigned to a base station having a relatively small cell radius. System frame number and Subframe number represents the system frame number and the subframe number for receiving the PRACH.

Physical channels in LTE are configured on a per-subframe basis, and the length of one subframe is 1 [msec]. One system frame is composed of 10 subframes. A value from 0 to 1023 is cyclically assigned to the system frame number. For example, when the PRACH Configuration Index=0, the PRACH is received only when the system frame number is an even number and the subframe number is 1. As a result, the PRACH is received in an interval of 20 [msec]. When the PRACH Configuration Index=14, the PRACHs are received in all of the subframes.

Uplink reception determining section 505 determines the PRACH Configuration Index based on the mode information provided from control section 504. Uplink reception determining section 505 outputs System frame number and Subframe number corresponding to the PRACH Configuration Index to uplink received signal processing section 503, and outputs the PRACH Configuration Index to downlink transmission signal processing section 507.

The transmission power determining section 506 determines downlink transmission power based on the mode information provided from control section 504, and outputs an instruction regarding the determined transmission power to downlink transmission signal processing section 507.

Downlink transmission signal processing section 507 generates a downlink baseband signal based on the instruction provided from transmission power determining section 506, and provides the downlink baseband signal to radio transmitting/receiving section 502. Here, the downlink baseband signal includes a PDCCH (Physical Downlink Control Channel) for multiplexing control information, a PDSCH (Physical Downlink Shared Channel) for multiplexing data signals or an SIB (System Information Block), a PBCH (Physical Broadcast Channel) for multiplexing notification information, SS (Synchronization Signal) for synchronizing a UE, and others. Note that, the PRACH Configuration Index provided from uplink reception determining section 505 is multiplexed on the PDSCH as the SIB.

Figure 7:
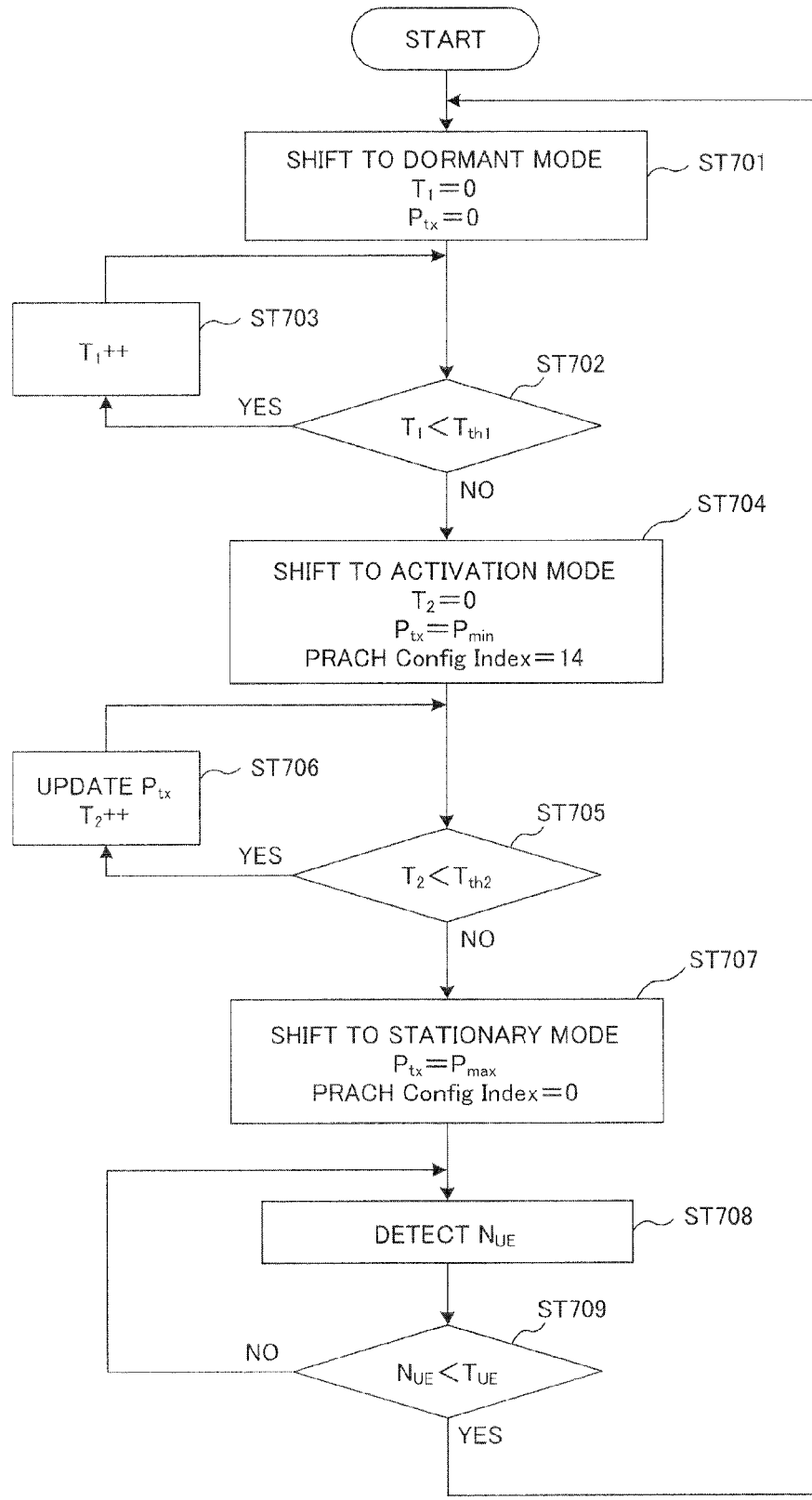
FIG. 7 is a flowchart illustrating an operation by the control section according to the embodiment of the present invention.

Details of operations by control section 504, uplink reception determining section 505, and transmission power determining section 506 will be described with reference to the flowchart illustrated in FIG. 7. MeNB shifts to the dormant mode immediately after placement (ST701). Here, the first timer $T_1$ is initialized, that is, $T_1=0$. In addition, no downlink transmission is performed, that is, downlink transmission power $P_{tx}=0$.

The first timer $T_1$ aims to measure an elapsed time from the point in time when MeNB shifts to the dormant mode. Until $T_1$ reaches the predetermined threshold $T_{th1}$, the dormant mode is maintained, and $T_1$ is kept incremented (ST702, ST703).

When the timer for $T_1$ expires ($T_1 \geq T_{th1}$), MeNB shifts to the activation mode (ST704). Here, the second timer $T_2$ is initialized, that is, $T_2=0$. Furthermore, the downlink transmission power $P_{tx}$ is set to the minimum transmission power, that is, $P_{tx}=P_{min}$. Furthermore, in order to enable reception of the PRACH in all of the subframes, the PRACH Configuration Index=14.

The second timer $T_2$ aims to measure an elapsed time from the point in time when MeNB shifts to the activation mode. The activation mode is maintained until $T_2$ reaches $T_{th2}$, and $T_2$ is kept incremented (ST705, ST706). At the same time, downlink transmission power $P_{tx}$ is updated. $P_{tx}$ is represented by the following equation.

(Equation 1)

$$P_{tx}=\min(P_{max}, aT+P_{min}) \quad [1]$$

$P_{max}$ denotes a maximum transmission power of MeNB, and a denotes an increase in the transmission power per unit time.

This process allows UEs near MeNB to conduct handovers to the MeNB easily. For example, in FIG. 3B, suppose that coverage 305 is formed at time $T_{305}$, coverage 306 is formed at time $T_{306}$, and coverage 307 is formed at time $T_{307}$. However, $0 \leq T_{305} < T_{306} < T_{307} \leq T_{th2}$.

Since UE 302 is present in coverage 305 formed at time $T_{305}$, UE 302 transmits the PRACH for conducting a handover to MeNB 301. Since UE 303 and UE 304 are outside of the coverage of MeNB 301, the handover to MeNB 301 cannot be started, and consequently PRACH cannot be sent either. Since the only UE transmitting PRACH is UE 302, PRACH transmitted from UE 302 is received by MeNB 301 in high quality, without interruption by another PRACH. As a result, the PRACH transmitted from UE 302 has increased possibility of being detected by MeNB 301, allowing a speedy handover to MeNB 301.

Even if the PRACH transmitted from UE 302 is not detected by MeNB 301 due to fading or interference by other cells, MeNB 301 receives the PRACH in all subframes. Accordingly, UE 302 can immediately resend the PRACH in the next opportunity for transmission.

Next, the explanation focuses on time $T_{306}$. At time $T_{306}$, coverage 306 is formed, and UE 302 and UE 303 are present in coverage 306. When $T_{306}-T_{305}$ is significantly longer than the time necessary for detecting the PRACH in UE 302, UE 302 has already completed a handover to MeNB 301 at time $T_{306}$. Accordingly, the only UE that transmits the PRACH at time $T_{306}$ is UE 303. As a result, the PRACH transmitted by UE 303 is received by MeNB 301 at high quality without being interrupted by another PRACH. Accordingly, the PRACH transmitted by UE 303 will have higher possibility of being detected by MeNB 301, allowing a speedy handover to MeNB 301.

For the same reason, UE 304 that enters the coverage of MeNB 301 at time $T_{307}$ can be immediately handed over to MeNB 301.

When the timer for $T_2$ expires ($T_2 \geq T_{th2}$), MeNB shifts to the stationary mode (ST707). The downlink transmission power $P_{tx}$ is set to the maximum transmission power, that is, $P_{tx}=P_{max}$. Furthermore, the PRACH configuration Index=0 in order to reduce the receipt frequency of the PRACH. With this process, more resources can be allocated to the uplink data communication than in the activation mode.

In the stationary mode, the number of UE $N_{UE}$ in the base station is monitored (ST708). When $N_{UE}$ is larger than a predetermined threshold ($T_{UE}$) (ST709), the stationary mode is maintained. When $N_{UE}$ is smaller than or equal to $T_{UE}$, MeNB shifts to the dormant mode.

As described above, according to the embodiment, when the downlink transmission is started, by setting MeNB to gradually increase downlink transmission power as the time passes so as to enable reception of the PRACH in more subframes than in the stationary mode, neighboring UEs can perform handovers to the MeNB easily.

Note that, in the embodiment, although the state shift from the dormant mode to the activation mode is performed under the condition that the first timer is expired, the present invention is not limited to this example. For example, the shift to the activation mode may be conducted based on a manual activation or an activation instruction signal from a core network.

In addition, the state shift from the activation mode to the stationary mode is performed under the condition that the second timer is expired. However, the present invention is not limited to this example, and the shift to the stationary mode may be made based on the number of UEs successfully conducted handovers, for example.

Furthermore, the transmission power in the stationary mode is the maximum transmission power provided by MeNB. However, the present invention is not limited to this example, and the transmission power may be any given transmission power.

In addition, in the embodiment, the shift of states from the stationary mode to the dormant mode is performed under the condition that the number of users is smaller than the predetermined threshold. However, the present invention is not limited to this example, and the shift to the dormant mode may be performed based on the data traffic or time information.

Although MeNB is used as an example in the explanation in the embodiment, the present invention is not limited to this example, and a small base station apparatus such as HeNB may take the same steps.

The disclosure of Japanese Patent Application No. 2011-099184, filed on Apr. 27, 2011, including the specification, drawings and abstract, is incorporated herein by reference in its entirety.

INDUSTRIAL APPLICABILITY

The radio base station apparatus and the communication control method according to the present invention are suitable for use in mobile communication systems, for example.

REFERENCE SIGNS LIST

101, 201, 301 MeNB
102, 202, 203, 204, 205 HeNB
103, 104, 105, 106, 206, 207, 208, 209, 210, 211, 212, 213, 214, 215, 216, 302, 303, 304 UE
305, 306, 307 Coverage
500 MeNB
501 Antenna
502 Radio transmitting/receiving section
503 Uplink received signal processing section
504 Control section
505 Uplink reception determining section
506 Transmission power determining section
507 Downlink transmission signal processing section

The invention claimed is:

1. A radio base station apparatus,
wherein the radio base station apparatus is configured to shift to a first state in which transmission and reception of a radio signal are stopped, a second state in which transmission and reception of a radio signal are started, and a third state in which a radio signal is transmitted in transmission power necessary for maintaining a predetermined communication range, the radio base station apparatus comprising:
    a downlink transmission signal processing section configured to instruct, in the second state and the third state, a terminal apparatus timing for transmitting an initial connection signal;
    an uplink received signal processing section configured to receive the initial connection signal transmitted by the terminal apparatus at the timing for transmitting the initial connection signal; and
    an uplink reception determining section configured to determine the timing for transmitting the initial connection signal such that the initial connection signal is sent more frequently in the second state than in the third state.

2. The radio base station apparatus according to claim 1, further comprising
    a first timer configured to measure a first elapsed time from a point in time when the radio base station apparatus shifts to the first state,
    wherein the radio base station apparatus is configured to, in the first state, shift to the second state once the first timer expires.

3. The radio base station apparatus according to claim 1, further comprising
    a second timer configured to measure a second elapsed time from a point in time when the radio base station apparatus shifts to the second state,
    wherein the radio base station apparatus is further configured to, in the second state, shift to the third state once the second timer expires.

4. The radio base station apparatus according to claim 3, further comprising
    a transmission power determining section configured to determine to increase the transmission power for the radio signal in such a way that the transmission power increases according to the elapsed time in the second timer.

5. The radio base station apparatus according to claim 1, further comprising
    a counter configured to manage the number of terminal apparatuses connected to the radio base station apparatus in the third state,
    wherein when a value of the counter is smaller than a predetermined value, the radio base station apparatus is configured to shift to the first state.

6. A method for controlling communication in a radio base station apparatus,
wherein the radio base station apparatus is configured to shift to a first state in which transmission and reception of a radio signal are stopped, a second state in which transmission and reception of a radio signal are started, and a third state in which a radio signal is transmitted in transmission power necessary for maintaining a predetermined communication range, the method comprising:
    instructing, in the second state and the third state, a terminal apparatus timing for transmitting an initial connection signal;
    receiving the initial connection signal transmitted by the terminal apparatus at the timing for transmitting the initial connection signal; and determining the timing for transmitting the initial connection signal such that the initial connection signal is sent more frequently in the second state than in the third state.

7. The method according to claim 6, further comprising using a first timer to measure a first elapsed time from a point in time when the radio base station apparatus shifts to the first state, and shifting the radio base station apparatus from the first state to the second state once the first timer expires.

8. The method according to claim 6, further comprising using a second timer to measure a second elapsed time from a point in time when the radio base station apparatus shifts to the second state, shifting the radio base station apparatus from the second state to the third state once the second timer expires.

9. The method according to claim 8, further comprising determining to increase the transmission power for the radio signal in such a way that the transmission power increases according to the elapsed time in the second timer.

10. The method according to claim 6, further comprising using a counter to manage the number of terminal apparatuses connected to the radio base station apparatus in the third state, shifting the radio base station apparatus from the third state to the first state when a value of the counter is smaller than a predetermined value.

11. The method according to claim 6, wherein the method is performed by the radio base station apparatus.

\* \* \* \* \*